(12) United States Patent
Vernier et al.

(10) Patent No.: US 6,791,530 B2
(45) Date of Patent: Sep. 14, 2004

(54) CIRCULAR GRAPHICAL USER INTERFACES

(75) Inventors: Frederic Vernier, Romans (FR); Chia Shen, Arlington, MA (US); Neal B. Lesh, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 438 days.

(21) Appl. No.: 10/053,652

(22) Filed: Jan. 21, 2002

(65) Prior Publication Data

US 2002/0101418 A1 Aug. 1, 2002

Related U.S. Application Data

(63) Continuation-in-part of application No. 09/651,002, filed on Aug. 29, 2000.

(51) Int. Cl.[7] .................................................. G09G 5/00
(52) U.S. Cl. ....................... 345/156; 345/750; 345/788; 382/296
(58) Field of Search ................................. 345/156, 157, 345/659, 660, 661, 689, 700, 705, 719, 730, 733, 734, 750, 761, 788, 168, 173; 382/293, 294, 295, 296, 298; 348/744

(56) References Cited

U.S. PATENT DOCUMENTS

| | | | | |
|---|---|---|---|---|
| 4,289,313 A | * | 9/1981 | Delamontagne | 273/256 |
| 4,415,928 A | * | 11/1983 | Strolle et al. | 348/442 |
| 5,519,401 A | * | 5/1996 | Farmer et al. | 342/185 |
| 5,982,917 A | * | 11/1999 | Clarke et al. | 382/132 |
| 6,196,548 B1 | * | 3/2001 | Schaefer | 273/292 |
| 6,267,671 B1 | * | 7/2001 | Hogan | 463/25 |
| 6,375,466 B1 | * | 4/2002 | Juranovic | 434/107 |
| 6,545,660 B1 | * | 4/2003 | Shen et al. | 345/156 |
| 2002/0163537 A1 | * | 11/2002 | Vernier et al. | 345/751 |
| 2004/0046784 A1 | * | 3/2004 | Shen et al. | 345/733 |

* cited by examiner

Primary Examiner—Xiao Wu
(74) Attorney, Agent, or Firm—Dirk Brinkman

(57) ABSTRACT

A system and method provides visualization and layout schemes for a circular graphical user interface using global and local polar coordinate systems to display images. The system gives a user of the interface the full capability to relocate, re-orient, scale and layout images in the circular interface. Further, methods are provided to layout images in the Cartesian coordinate system, minimizing overlapping and crowding of images, and supporting users' focus in a group setting for group collaboration around the interface.

18 Claims, 15 Drawing Sheets

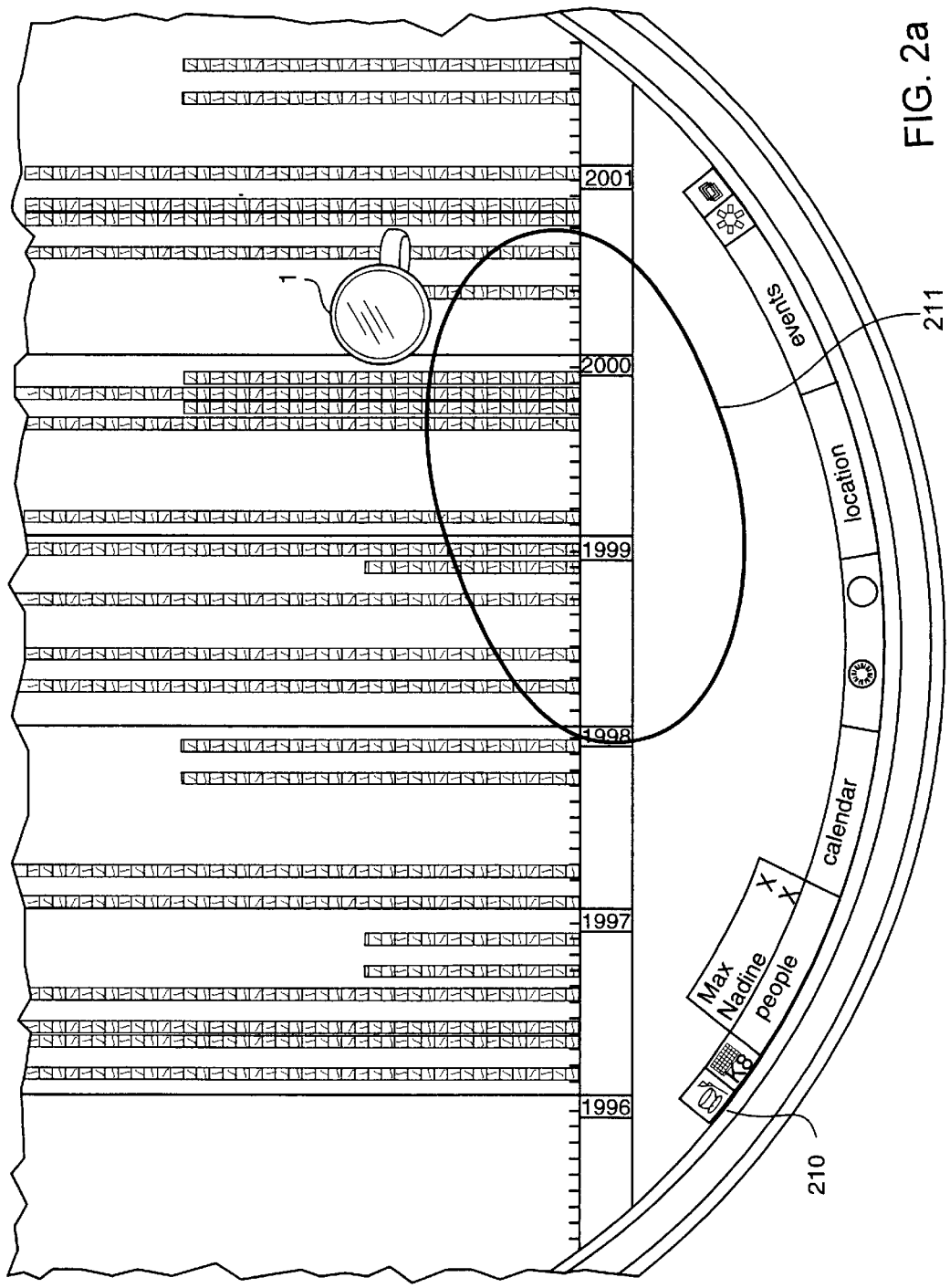

CIRCULAR GRAPHICAL USER INTERFACES

CROSS-REFERENCE TO RELATED APPLICATION

This is a continuation-in-part of U.S. patent application Ser. No. 09/651,002 "Multi-User Interactive Picture Presentation System," filed by Shen et al. on Aug. 29, 2000.

FIELD OF THE INVENTION

The present invention relates generally to graphical user interfaces, and more specifically, to displaying images using circular graphical user interfaces.

BACKGROUND OF THE INVENTION

Picture presentations are an important aspect of many professional and social settings. Executives make presentations to directors, managers conduct meetings with staff, salespersons make presentations to potential customers, doctors conduct meetings with nurses, lawyers make presentations to juries, and families and friends present and share photographs of occasions in their lives.

Frequently, much effort goes into generating and delivering effective picture presentations. With specialized software, conventional personal computer systems can provide effective platforms for generating and conducting presentations. Currently available presentation program modules can turn a personal computer into a customized presentation system for generating and delivering picture presentations using display terminals or digital projectors.

Generally described, these prior art presentation systems provide a specially designed, user-friendly, pallet of tools to assist in the generation of a presentation to be subsequently displayed to an audience. These presentation systems also allow the pictures to be sequentially presented to an audience, picture-by-picture, with color, animation, audio, and transition effects that enrich and enliven the presentation.

Conventional presentation systems do not provide an effective means for interacting with the content of the presentation during the course of the presentation. This drawback arises because these conventional presentation systems have only two modes of operation, an edit mode and a show mode. A single user often generates the presentation, and then subsequently delivers the same presentation to an audience. During the course of the presentation, the single user can interact with the content of the presentation only by invoking the edit mode, which primarily allows the user to rearrange the order in which the presentation is arranged.

A significant drawback arises when using these conventional presentation systems because all other participants of the presentation cannot concurrently interact with the content of the presentation. Conventional systems are designed for use by a single presenter to a passive audience, and not for a setting where all participants of the presentation interact with the presentation on an equal footing. The presentation is typically conducted in a linear setting. The presenter faces the audience, and the audience views the presentation behind the presenter. The presenter can either look at the audience or the presentation, but not at both at the same time.

Furthermore, a conventional presentation system only has a single set of controls. To allow any one other than the presenter to control the presentation can be quite disruptive and cumbersome. Also, most computer implemented presentation systems that concurrently display multiple pictures use the same rectangular format as used by mechanical slide-sorter. These require that the typical single user has a specific orientation with respect to the displayed presentation. These types of systems are not suited for situations where multiple participants are facing each other and the displayed presentation, in a highly interactive and multi-dimensional manner.

An alternative presentation system can use a circular display surface, such as a tabletop. There are many advantages of tabletop displays over traditional presentation systems, such as white boards, projection screen, desktops computers, or handheld devices, particularly for collaborative tasks where multiple users need to both work with each other and access computer resources.

Users can sit around a table and thus easily face each other, rather than try to crowd around a computer screen, or a small handheld device. A tabletop provides shared space and also allows users to have their own personal, if not entirely private, space to work on. Finally, whether it is an electronic display or not, a tabletop affords a convenient space where users can spread out and organize images. Recently, a number of alternative display systems have been described, see for example: Wellner P., "The DigitalDesk Calculator: Tangible Manipulation on a Desk Top Display," Proceedings of UIST '91, ACM Press, pp. 27–33, November 1991; Wellner P., "Interacting with Paper on the DigitalDesk," Comm. ACM Vol. 36, 7, pp. 86–96, 1993; Streitz, N. et al. "i-LAND: An Interactive Landscape for Creativity and Innovation," Proceedings of the ACM Conference on Human Factors in Computing Systems (CHI'99), pp. 120–127, 1999; Prante, T., Muller-Tomfelde, C., Streitz, N., Steinmetz, R., "ConnecTables: Dynamic Coupling of Displays for the Flexible Creation of Shared Workspace," Proceedings of the $14^{th}$ Annual ACM Symposium on User Interface Software and Technology (UIST'01), November, 2001; and Guimbretiere, F., Stone, M., Winograd, T., "Fluid Interaction with High-resolution Wall-size Displays," Proceedings of the $14^{th}$ Annual ACM Symposium on User Interface Software and Technology (UIST'01), November, 2001.

The DigitalDesk is a physical desk augmented with vision and projector capabilities so that the physical and electronic desktops are merged into one. DigitalDesk is designed for a single user. The InteracTable in the i-Land project provides a rectangular surface for multiple users. However, most of these tabletop user interfaces organize images in a rectangular manner. It is desired to provide a circular graphical user interface.

SUMMARY OF THE INVENTION

The invention provides visualization and layout schemes for a circular graphical user interface. Because the interface uses polar coordinate systems to display images, prior techniques, which typically use Cartesian coordinate systems, are inapplicable.

It is an object of the invention to give the user of the interface the full capability to relocate, re-orient, scale and layout images in the circular interface.

It is another object to provide methods to layout images in the Cartesian coordinate system.

It is also an object to minimize overlapping and crowding of images.

It is an object to support users' focus in a group setting for group collaboration around the interface.

More particularly, a system and method visualize images selected from a database on a circular graphical user interface. Each selected image is oriented with respect to a global polar coordinate system, a local polar coordinate system, and a radial distance from the center of each image to the center of a display surface of the circular graphical user interface. A global angle α of the global polar coordinate system measures rotation of the center of the each image around the center of the display surface, and a local angle β measures an offset of a central axis of each image from the angle α. Each oriented image can then be rendered on the display surface of the circular graphical user interface.

BRIEF DESCRIPTION OF THE DRAWINGS

FIG. 2a is a diagram of an ink pad icon in use;

DETAILED DESCRIPTION OF THE PREFERRED EMBODIMENT

System Structure

Figure 1:
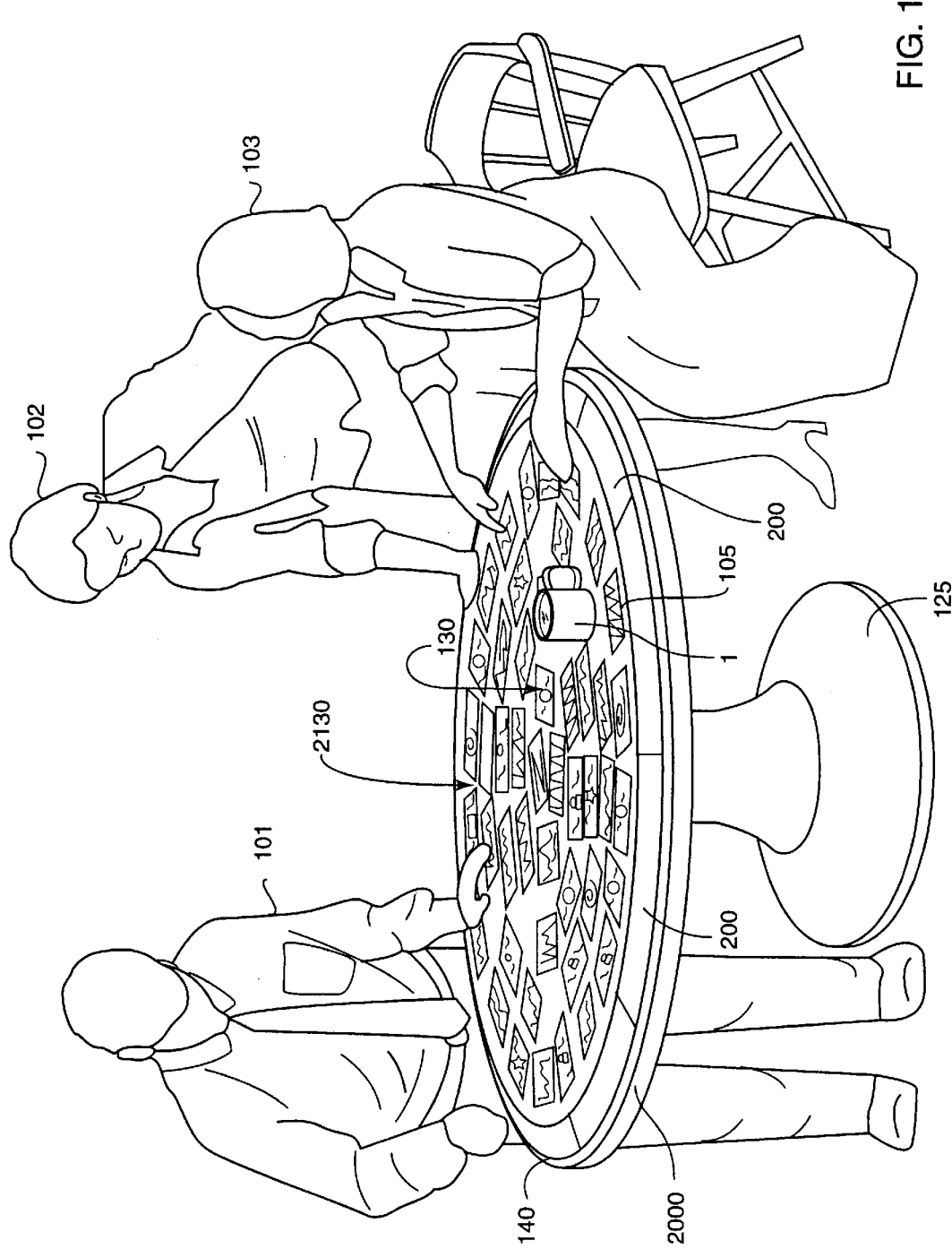
FIG. 1 is a diagram of a multi-user circular graphical interface according to the invention.

FIG. 1 shows multiple users 101–103 in the vicinity of a circular graphical user interface 100 according to our invention. The users share and interact with a picture presentation in a dynamic manner. The method according to the invention displays images 2130 on a display surface, i.e., the horizontal tabletop 130 of a circular table 125. The images can be of photographs, computer generated images, icons, documents, or any other displayable image. In the preferred embodiment the display surface is touch sensitive.

Figure 10:
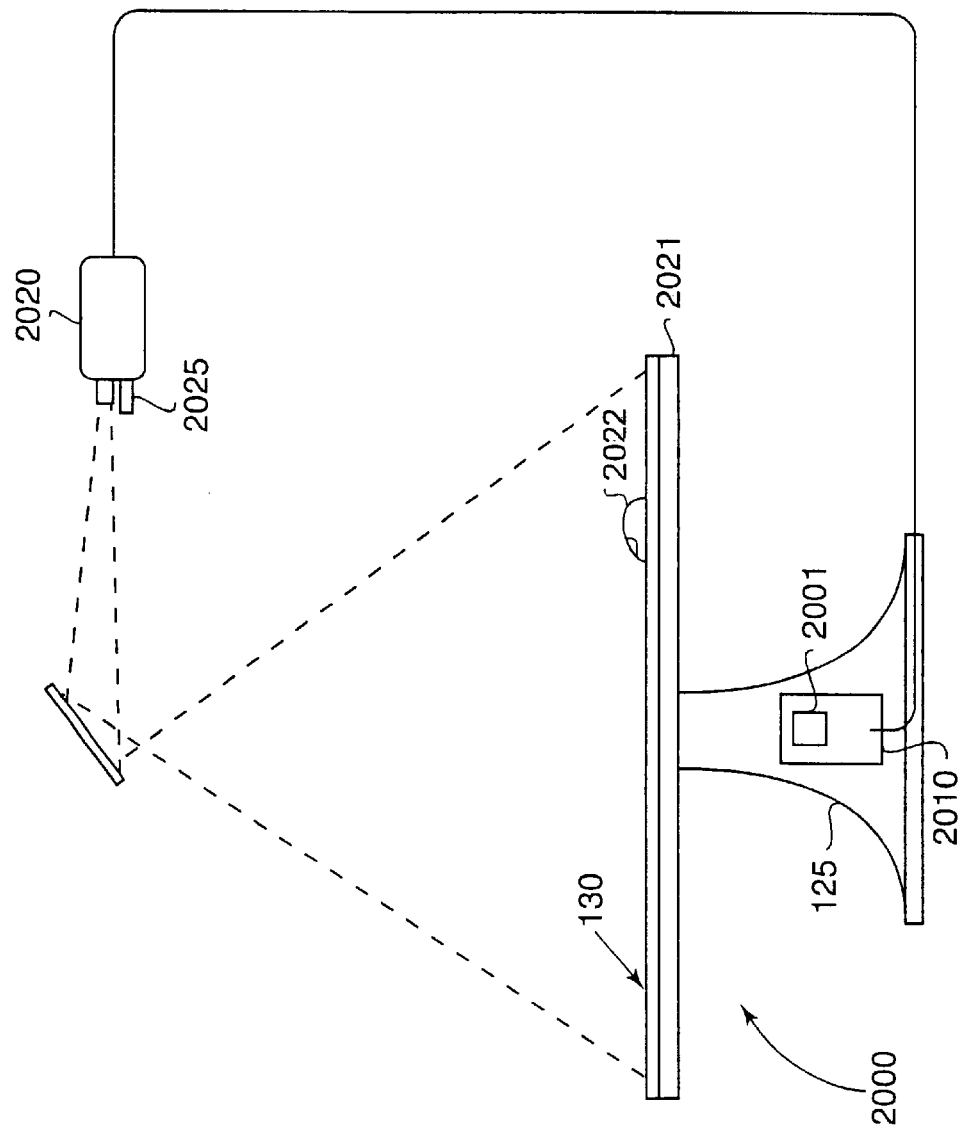
FIG. 10 is a block diagram of a presentation system according to the invention.
Figure 11:
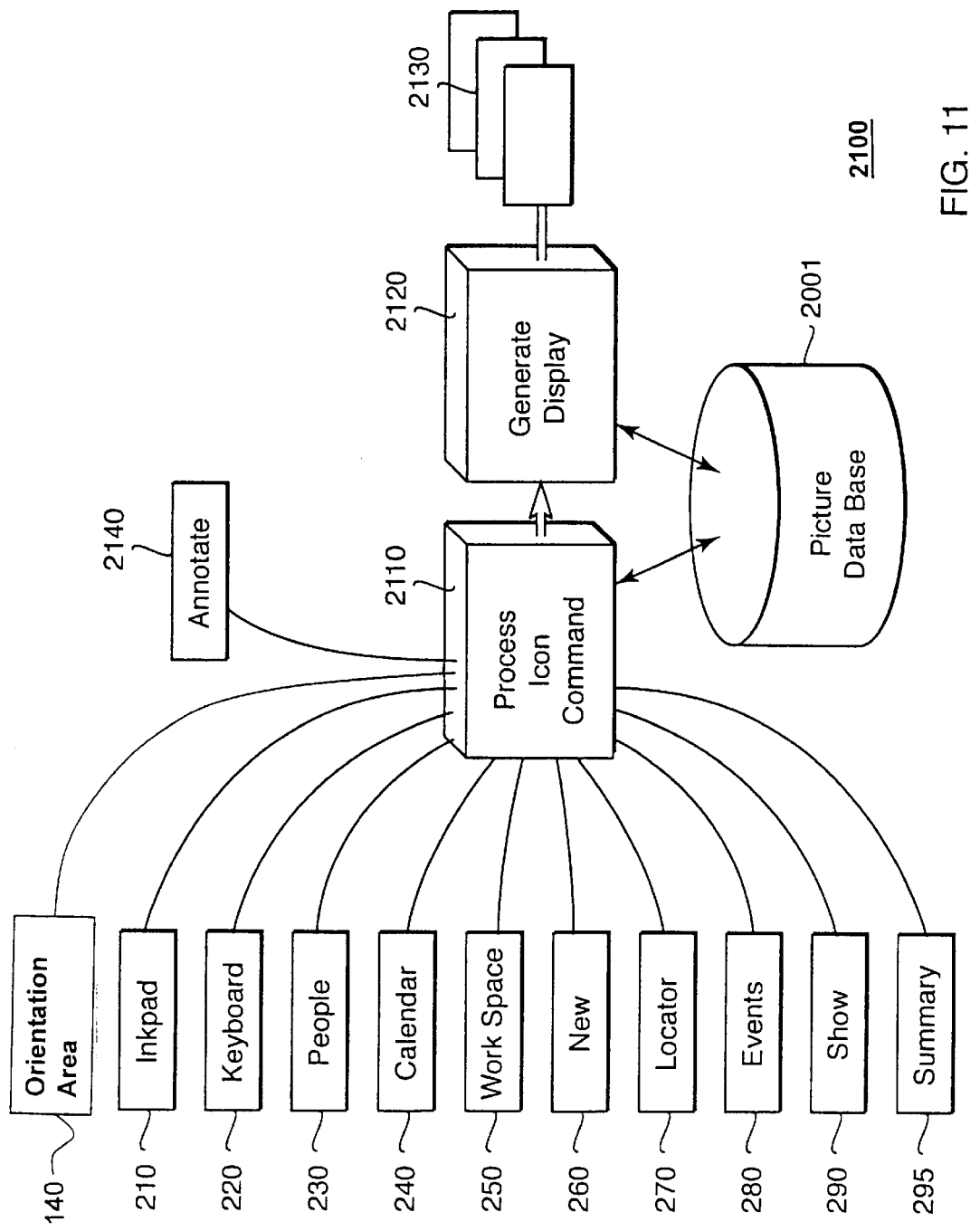
FIG. 11 is a block diagram of a process used by the presentation system according to the invention.

The images are composited by a processor 2010 executing a method 2100 according to the invention, see FIGS. 10 and 11. The composited images are displayed onto the display surface by the process 2100. The displayed images are composited in response to user input commands. User input can be via a touch surface 2021, keyboard, mouse 2022, and the like. As an advantage, the present system can be operated concurrently by multiple users. In the preferred embodiment, the display surface is circular.

Some of the Figures also show a coffee mug 1 on the top of the table. The coffee mug 1 is not part of the invention, but often coffee mugs are key items present during presentation, professional or social. As an advantage, the present invention gracefully admits integration of coffee mugs or other physical discussion items with the presentation. In fact, using a camera 2025 coupled to a vision system of the processor 2010, the displayed images can be composited in such a way that physical items that are not part of the user interface do not obscure significant portions of the images.

The interface includes an orientation area 140, and a plurality of control panels 200. In the preferred embodiment, the orientation area 140 is an annular ring at the periphery of the images. The control panels are composited within the annular ring. There is one control panel for each user. The control panels 200 are displayed in a region of the display surface 130 in front of the user. The camera 2025 can be used to track the users 101–103 so that as the users move around the display table, their respective control panels follow. Alternatively, the users can employ a pointing device to indicate where their respective control panels should appear on the table top.

The main purpose of the system 2000 is to manipulate and present photographs, slides, text, videos, hereinafter "images" 105. The images are manipulated by the users using the control panels. The images can be associated with sound-tracks so that when images are selected, the sound-track can also be played. The images can also be annotated with text.

The "images" 105 are organized in a relational database 2001, described in further detail below, see FIG. 11. The images can be in the form of digital images, e.g., files with bmp, .jpg, mpg, .gif, .pdf, or .eps extensions, to name but a few. Images can have associated audio files in .wav files, for example. As described below, each image is annotated according to names or "people," date or "calendar," location, and events.

Images 105 are selected from the database with the control panels 200 and the selected images are composited into the displayed images 2130. Multiple users can interact with compositing process in a concurrent and interactive manner. The orientation area 140 is used to orient the "content" of the presentation image 2130. If the orientation area is circular, then the displayed image can be rotated like a lazy Susan. The rotation is achieved by the process 2100 that composites the image with a selected orientation. The ring can be projected onto the touch sensitive surface of the table top.

Figure 2:
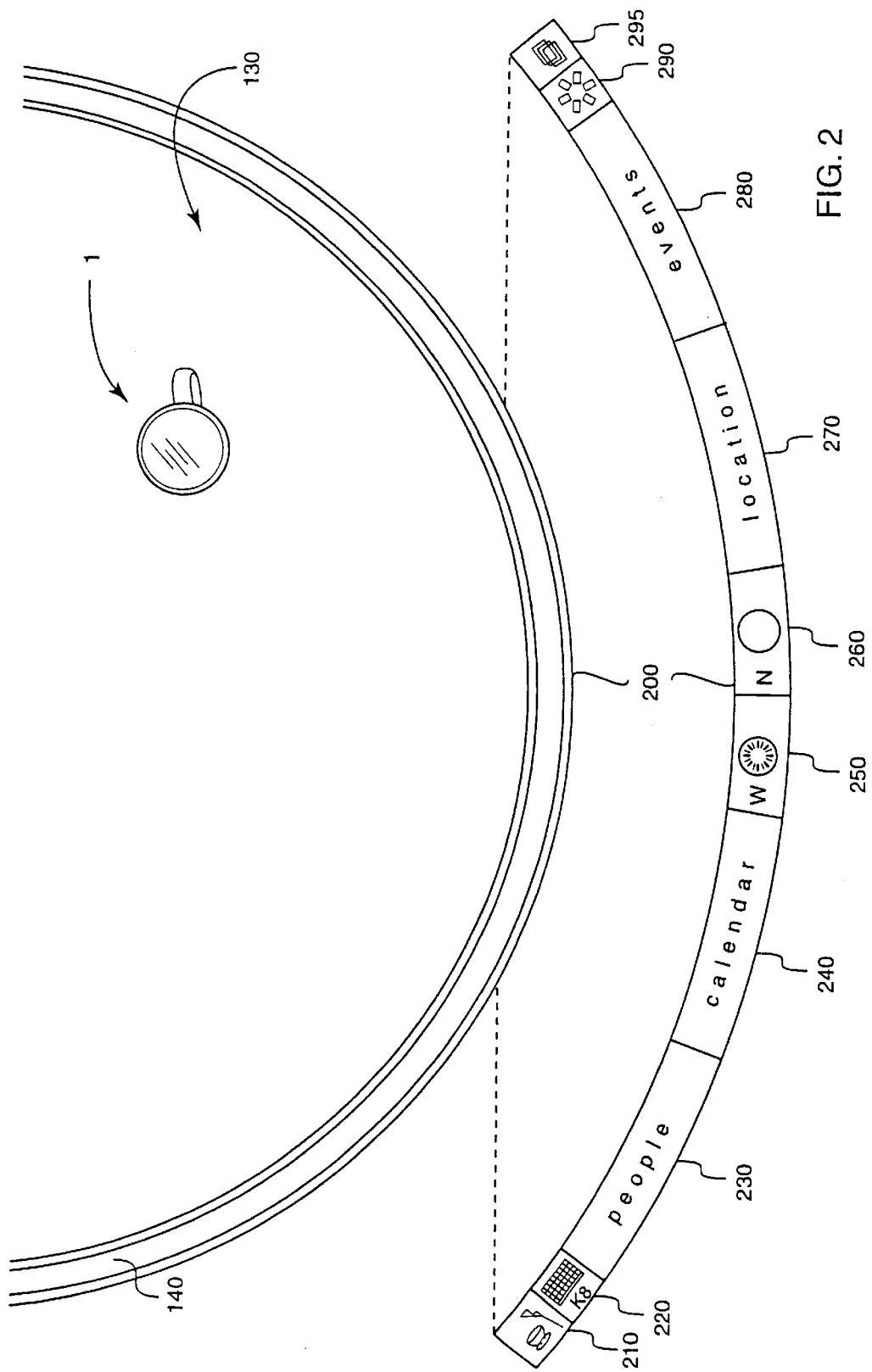
FIG. 2 is a diagram of a display area and a user control panel.

FIG. 2 shows icons of the place mat or control panel 200 in greater detail. Each user control panel includes the following icons: an inkpad 210, a keyboard 220, a people 230, a calendar 240, a work space 250, a new 260, a location 270, an events 280, a show 290, and a summary 295. A mouse or a touch sensitive technique can be used to activate the icons of the control panels 200. Initially, the icons are displayed as black on a white background, but when an icon is activated or selected, the icon is displayed in full color.

Figure 2B:
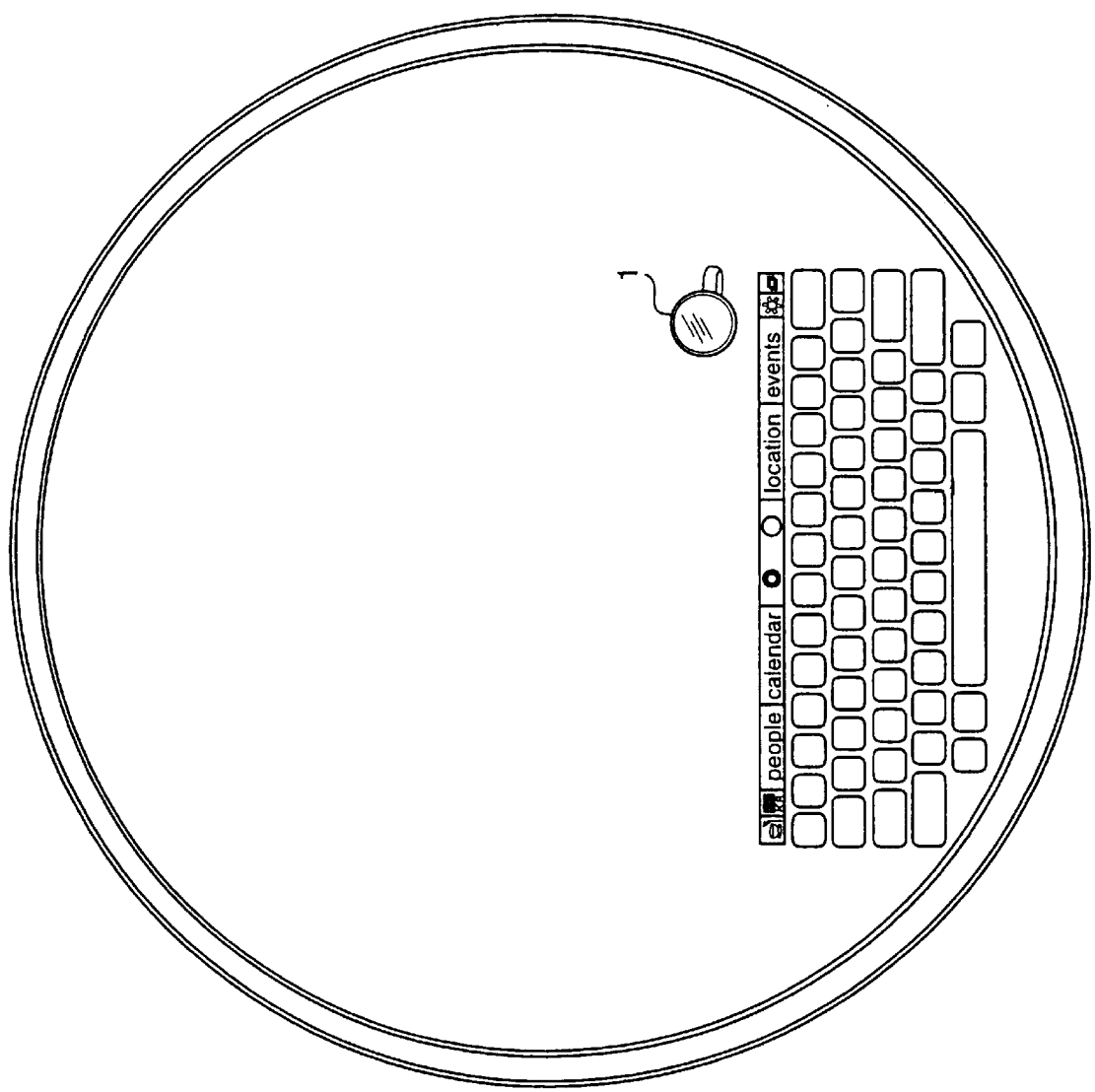
FIG. 2b is a diagram of a touch sensitive keyboard display.
Figure 2C:
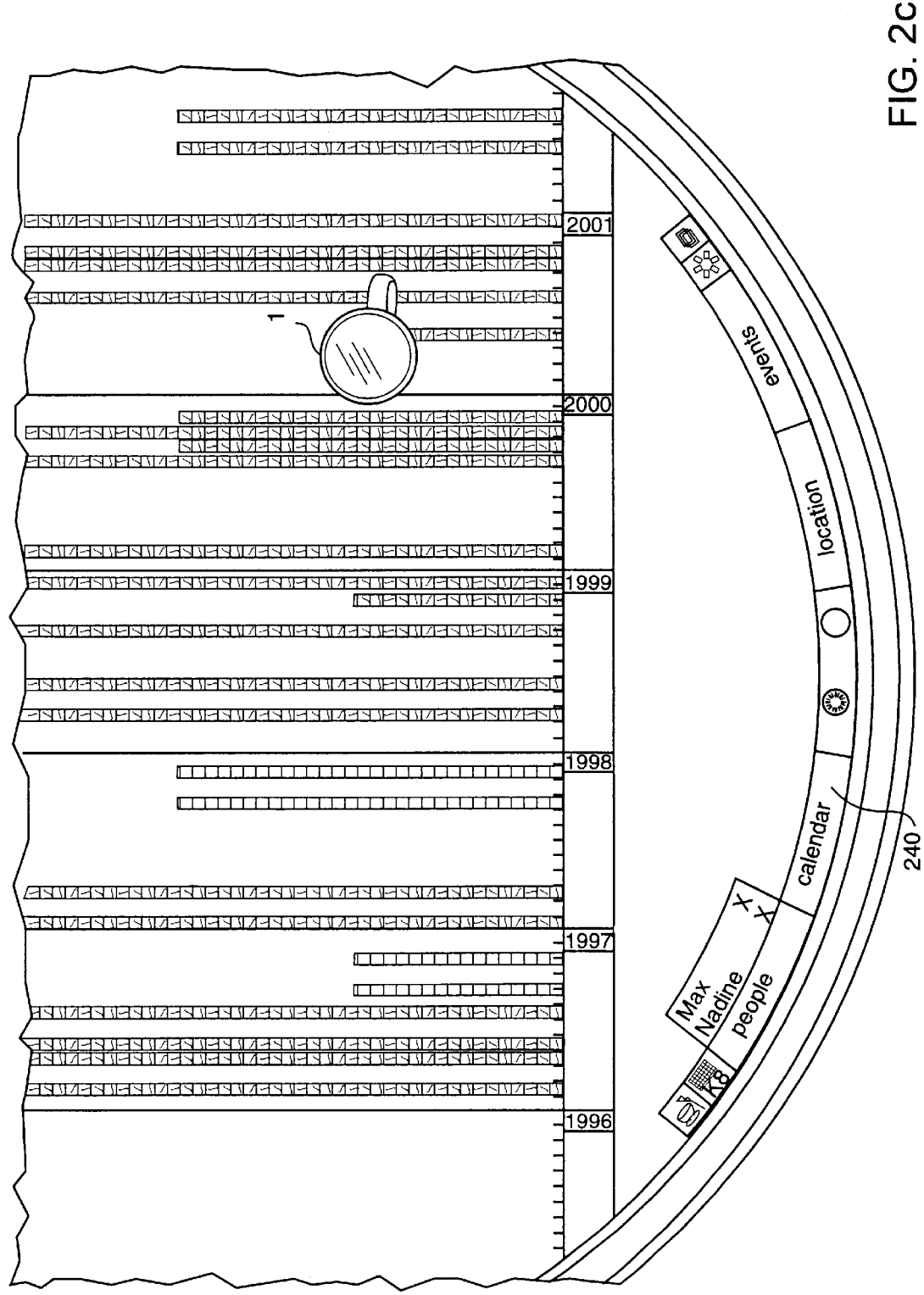
FIG. 2c is a diagram of a calendar view display.

The inkpad icon 210 switches operation to a mode where a pointing device, e.g., a mouse or a finger, can be used to select an area 211 of the displayed image, see FIG. 2a. The keyboard icon 220, when activated, displays a touch sensitive keyboard, see FIG. 2b. The people icon 230 displays a people panel, see FIGS. 3–4. The calendar icon 240 displays images in a calendar view, see FIG. 2c. The workspace icon 250 displays a workspace and any images that last were part of the work space. The work space behaves as a scratch or copy buffer. Images saved in the workspace can be later recovered.

Figure 2D:
FIG. 2d is a diagram of a map display.

The new icon 260 resets the table top display to an initial condition. The location icon 270 displays a map, see FIG. 2d. The events icon 280 arranges the display in an events oriented mode. The show icon 290 displays all selected images. The summary icon 295 displays a subset of currently selected images.

Figure 3:
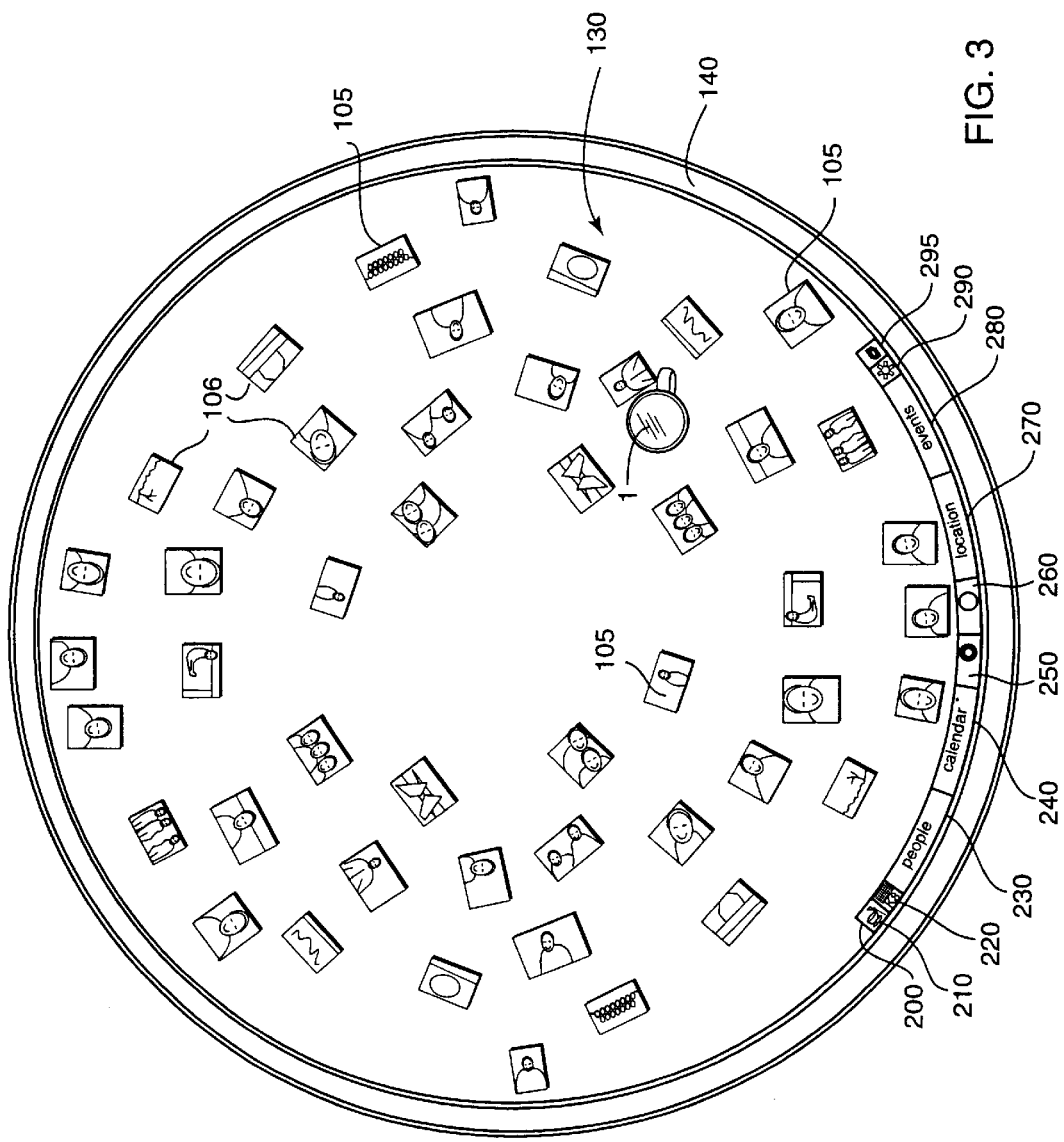
FIG. 3 is a diagram of a multiple picture presentation in the circular interface.

As shown in FIG. 3, the images are manipulated by the people, calendar, location, and events icons. The processor, described below, integrates all separate digital files of images into a single image for display purpose, thus individual images or the entire image as a whole can readily be manipulated. FIG. 3 shows the arrangement of the images when the people icon 230 is activated or selected. In this case, each image 105 includes an image of one or more persons, and annotation text identifying the people in the images. Initially, the images are shown using a gray scale. If a specific image 105 is specifically selected, then that image is shown in full color.

The image is shown with an orientation towards the control panel from where the selection took place, i.e., generally facing the user that selected the image. Should another user subsequently want to view the same image, selection will rearrange and reorient the image in the overall image accordingly, as described in further detail below.

Figure 4:
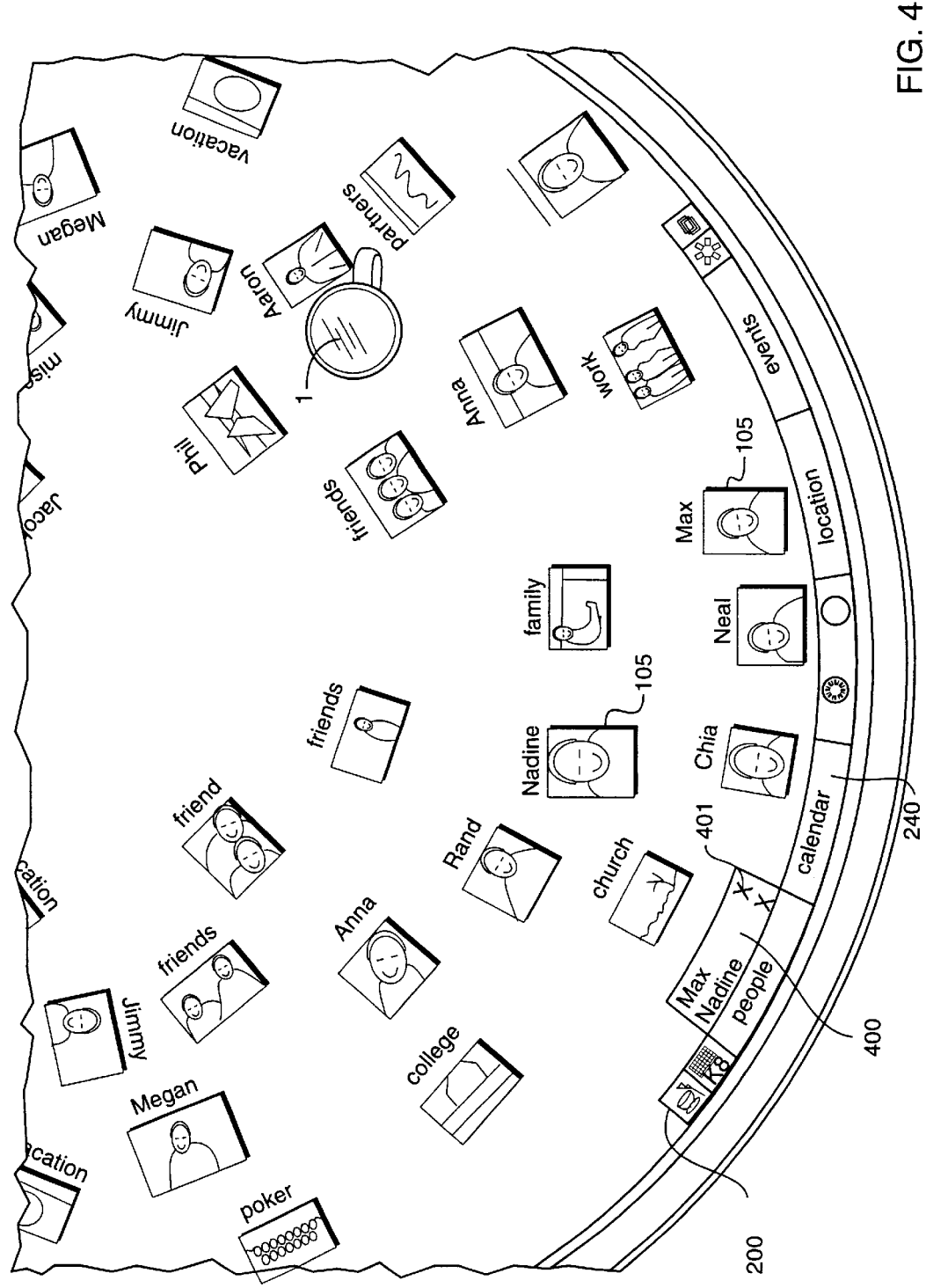
FIG. 4 is a diagram of pictures organized according to people.

FIG. 4 shows two selected images 105, and a tab area 400 where the selections, e.g., "Nadine" and "Max," are marked with an "x" 401. Pointing at the "X" will deselect the image.

In order to support individual user viewing preferences and group shared viewing needs, our interface provides two general user interface functions. First, the entire circular interface can be freely rotated in either direction. This operation is a very convenient way to pass around a global layout of the interface for each individual user's viewing angle. In addition, we allow control panels to be positioned along the perimeter of the tabletop wherever a user is sitting. These features are shown in FIGS. 1–4, where two users are quite near each other, and an other user is on an opposite side of the interface.

FIG. 10 shows the system 2000 according to the invention. The system includes a processor 2010 coupled to a projector 2020 and an input device, e.g., a touch sensitive surface or a mouse. Images are displayed on the top 130 of the table 125 under user control with the input device. The system also includes a relational database 2001 for storing the annotated images 105.

FIG. 11 is a flow diagram of a process executing in the processor 2001 while generating the sequence of images. Activating the icons 210, 220, 230, 240, 250, 260, 270, 280, 290, and 295 cause the images to be composited as described above. Activating the orientation area 140 causes the image to be oriented in a specified manner, for example, if the area is a ring, the activation will rotate the images 2130. The annotate function 2140 is used to add the name, date, location, and events annotations to the pictures 105 stored in the picture database 2001. During operation of the system step 2110 processes the icons upon activation or selection, and step 2120 generates the composited images 2130.

Interface and Image Orientations

Traditional rectangular interfaces typically assume that the user or users always view the interface from roughly the same direction and angle, namely from directly in front of the interface. Prior art interfaces typically use a rectangular (Cartesian) coordinate system to display images. For example, the images are almost always aligned according to the rows and columns of pixels, which can sometimes further define rectangular windows that partition the display area or screen.

In contrast, our invention enables face-to-face collaborations where the interface is situated between the users, and thus we must consider issues of rotation and re-orientation of the entire display interface, including the images that are displayed there. Thus, we provide a method for visualizing and interacting in order to facilitate the convenient re-orientation of any or all images on the interface surface, the passing images around the interface surface, and the size of the user interface and the images. With our system, the users can rotate the entire interface, or move individual images. Therefore, our circular interface maintains two independent polar coordinate systems, a global polar coordinate system is interface centric for the entire circular display interface, and a local polar coordinate system is image centric for each individual image displayed on the surface.

Figure 5:
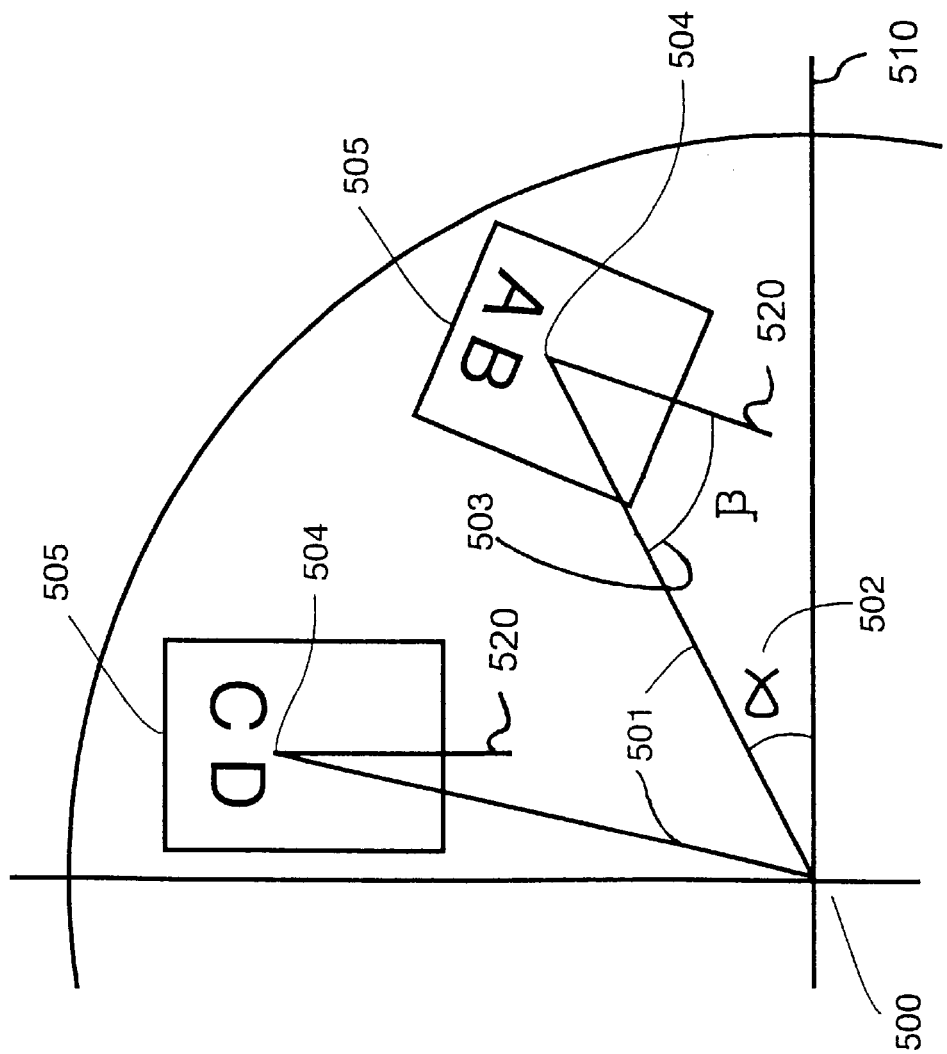
FIG. 5 is a diagram of polar coordinate systems used by the invention.

As shown in FIG. 5, we use these two polar coordinate systems to determine three variables: a radial distance r 501 from a center 504 of each image 505 to the center 500 of the display surface, an angle $\alpha$ 502 of rotation around the center of the interface, and an angle $\beta$ 503 of rotation around the center of each image. The angle $\alpha$ is with respect to some reference line 510 of the display surface, and the angle $\beta$ is an offset from angle $\alpha$ to a central axis 520 of each image. For comparison, the image labeled "AB" has an angle $\beta$ greater than an angle $\alpha$, and the image labeled "CD" has a very small angle $\beta$ and an angle $\alpha$ that is close to 90°.

In addition, we can also use two other variables to control the size, or "virtual" depth associated with our circular interface, a variable (Z) controls the size of the entire display surface, that is its radius, and for each image, variables (z), one for each image, controls the size of the image. The variables z, and Z are effectively perpendicular to the plane of the display surface. That is, images at the plane of the display surface have a zero depth, a positive depth indicates images farther away that are displayed smaller, and a negative depths are used for images closer to the user and that are displayed larger. The depth or size in effect gives the user a zooming capability. These variables represent the four degrees of freedom of the images to consider in the interaction, three degrees are in the plane of display surface, and one degree of freedom is virtual depth, or image size.

One challenge with our graphical user interface is to allow users to manipulate the images. When sliding physical items, e.g., photographs or documents, on a table, one can use two or more fingers to control both the location and orientation of the image. With traditional touch-screen or mouse-based pointers, a user has only one point of contact to work with. It is cumbersome for the user to have to have separate functions to control location and orientation. Thus, we allow the user to control two dimensions the distance r 501 and the angle $\alpha$ 502, and our system automatically manages the angle $\beta$.

We have two modes of managing the angle $\beta$ that we call polar orientation, and rectangular orientation. In the polar mode, as shown in FIGS. 1, 3 and 4, a central axis of selected or all images is substantially oriented in the direction of the center of the display surface. In this mode, every angle $\beta$ is zero.

Figure 6:
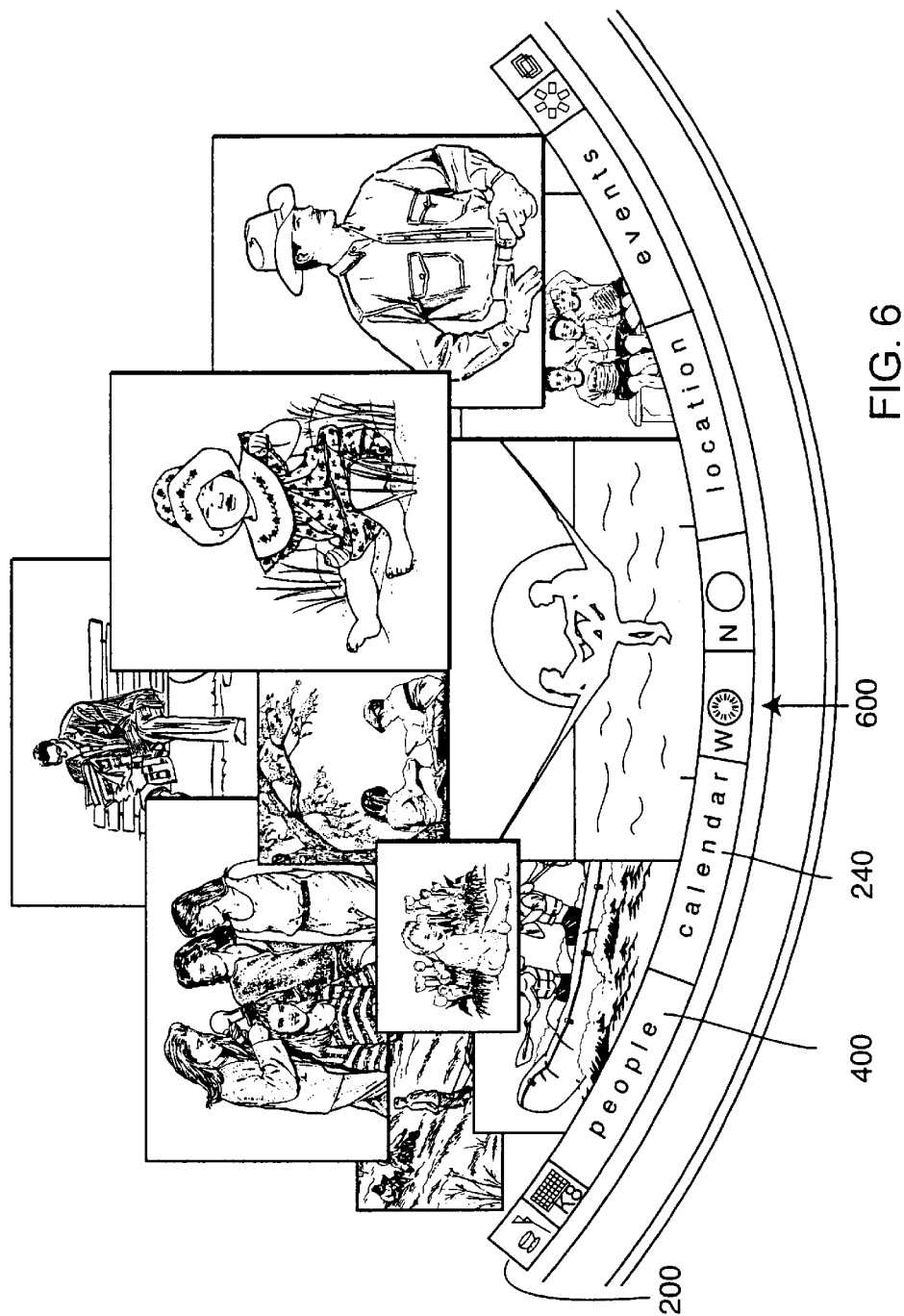
FIGS. 6–8 are diagrams of scaled images according to the invention.

In the rectangular orientation mode, as shown in FIG. 6, selected or all images are oriented to face a direction determined by the position 600 of the control panel of the user who activated this mode. That is, the central axes of the selected images are parallel. If a global angle of the menu is $\phi$, then every angle $\beta = -\alpha + \phi$. The rectangular mode can also be used in conjunction with the ability to rotate the entire interface.

After reorienting the images in either mode, the user can rotate the interface to face some other user, and the images "stick" to interface while it is rotated, so that all images now face some other user. Rotating the display surface essentially means rotating the reference line 510 so that the entire global polar coordinate system is rotated while the local polar coordinate systems of the images remain fixed with respect to the global coordinate system.

Image Size

Figure 7:
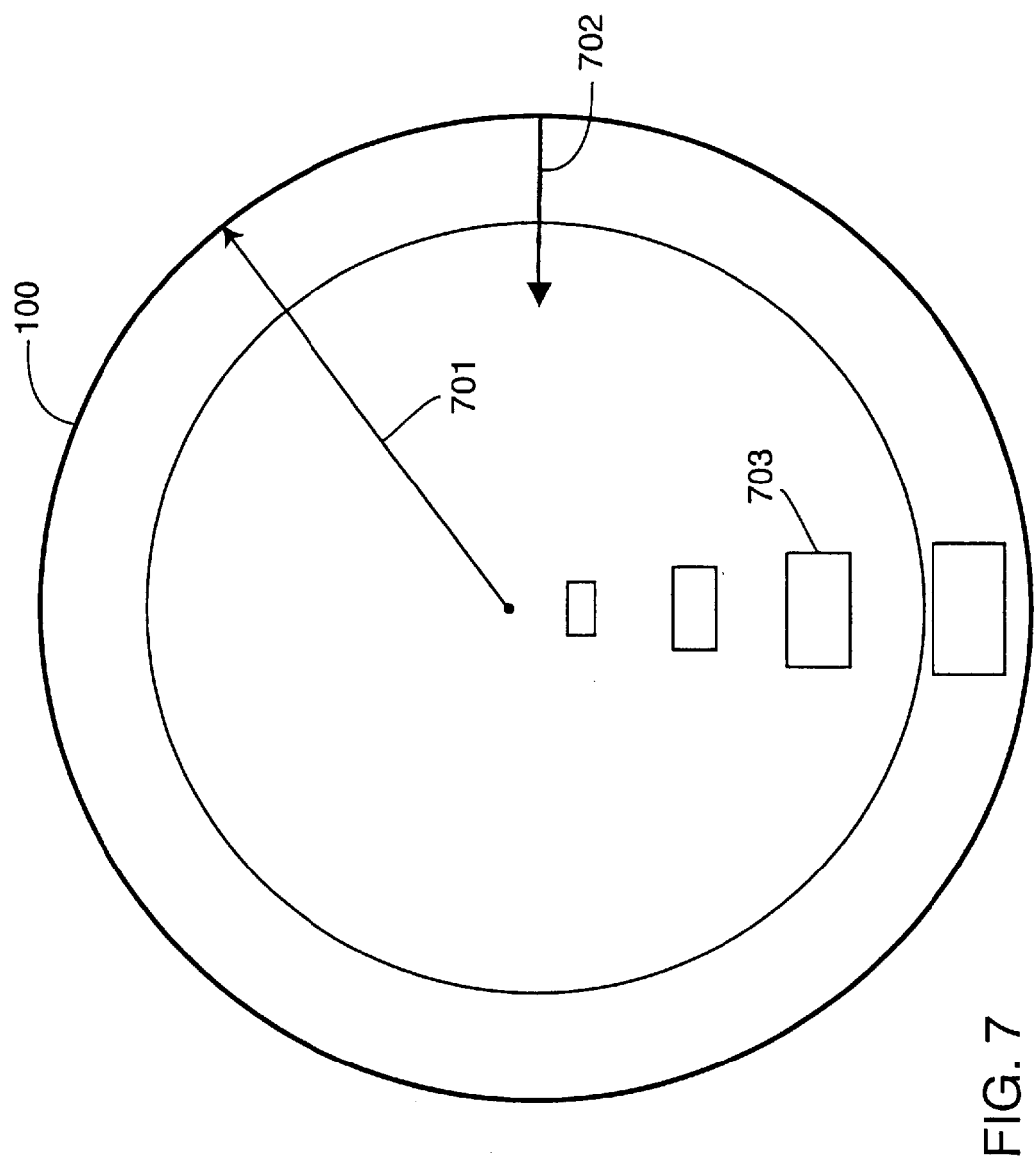
Figure 8:
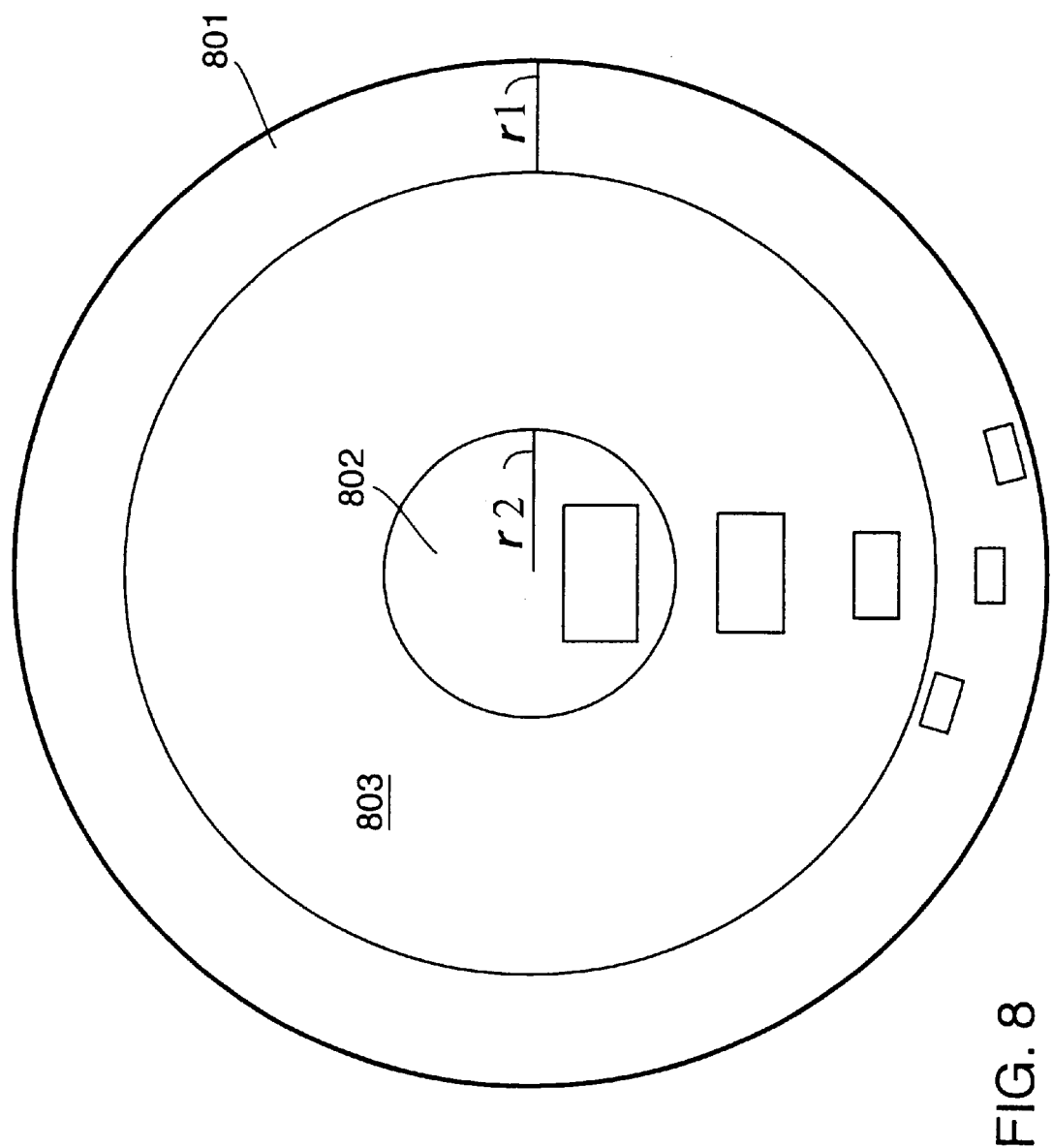

Image size can be used to emphasize certain images for discussion or better viewing. We provide two different automatic size scaling techniques. As shown in FIG. 7, a first technique increases the size of images that are nearer to the periphery, and decreases the size of images near the center of the interface. In other words, the size of each image is proportional to a distance to the periphery of the display interface. A second technique works in reverse shown in FIG. 8, with images near the center of the interface being larger, and images near the periphery being smaller. In other words the size of each image is proportional to a distance to the center of the display interface.

The size of the image for the first automatic technique is determined as follows. A normalized radius R 701 of the circular display surface is 1.0. A radial distance r 702 from the periphery of the interface is in the range 0<=r<=1. A first scaling factor is determined by $$\text{first scaling factor} = \left(\frac{R}{1-r}\right)^N.$$

To ensure that the size of the scaled image is never too small, we threshold the scale factor with a minimum constant, e.g., 0.1, after applying the above scaling to the image. In the preferred embodiment N is 0.5.

The second technique works as follows. In a first area near to the periphery of the interface, e.g., annular ring 801, i.e., less than the radius r1, the second scaling factor is a minimum constant (MINIMUM), and in an area close to the center, e.g., circle 802, i.e., less than the radius r2, we apply a maximum (MAXIMUM) constant. In areas 803 between these two areas 801–802, the second scaling factor is $$\text{second scaling factor} = \frac{(\text{MAXIMUM} - \text{MINIMUM}) \times (1 - R)}{1 - r1 - r2}$$

The first technique can be used for two users to exchange an image. For example, one user "pushes" an image to the center of the interface, and then "gives" a larger version of the image to another user. By making the image larger, potentially interested users can view the image in detail before deciding to take it or not. The second technique allow users to push many images into the central area of the interface without filling the space too fast.

Hierarchical Visualization

The scaled visualizations described above enable users to concurrently manage and manipulate many images. However, as more images are brought into the interface, the visualizations can become cluttered and eventually difficult to use as the number of images becomes very large.

Figure 9:
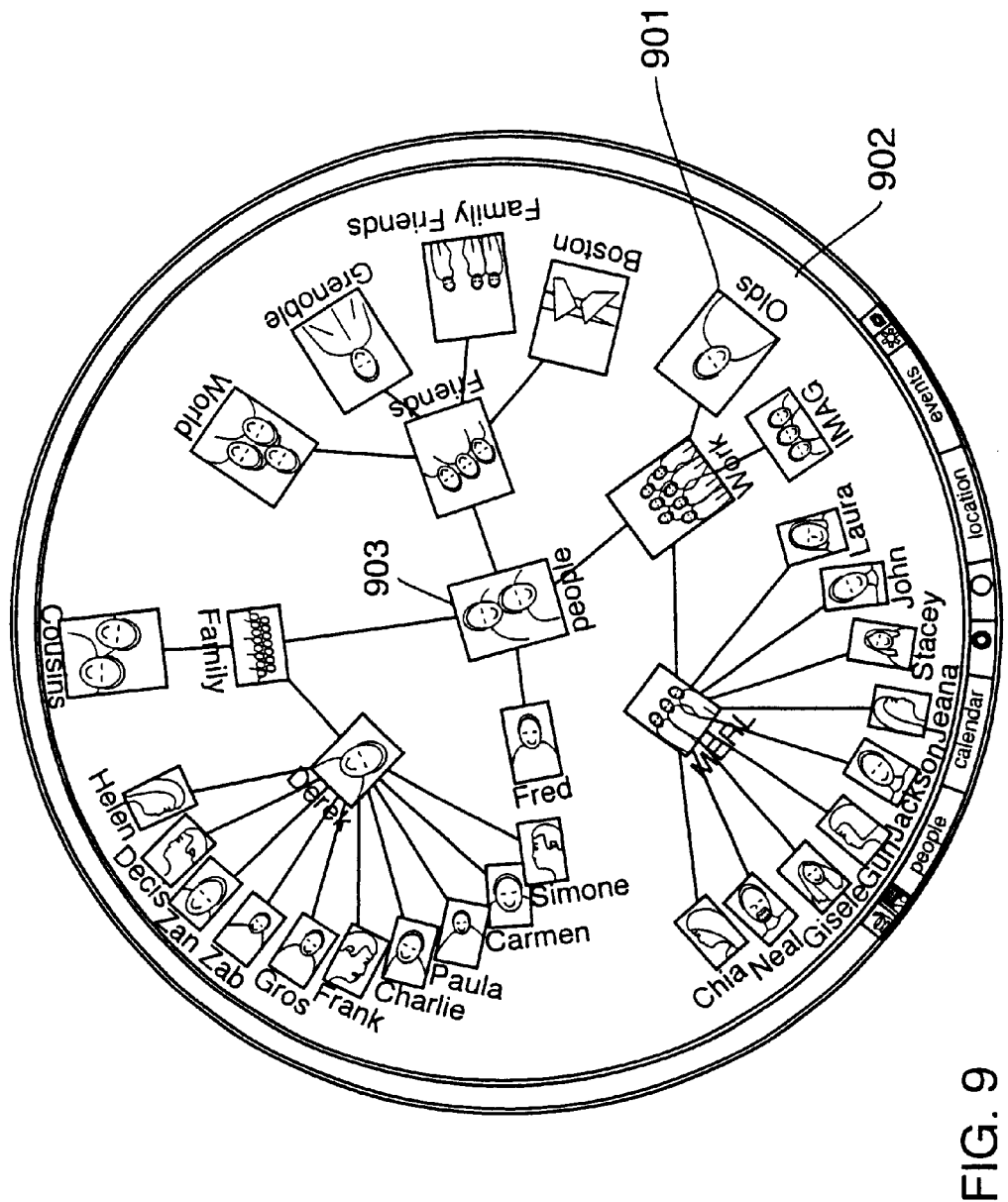
FIG. 9 is a diagram a hierarchical arrangement of images.

Therefore, we provide for hierarchical representations of images. In particular, we allow the users to form sets of images, which contain individual images, or other sets. In the hierarchy of FIG. 9, each leaf 901 of the hierarchy is a portrait of a person, and an associated text string 902 gives the name of the person in the portrait. The non-leaf nodes of the hierarchy, such as a root 903 titled "People," in the center, are represented by a mosaic of selected images of that node's children. The default position of the root is the center of the interface, however, the root can be located elsewhere by the users. Sets of images can be "bookmarked," along with a database query that was used to generate the set. Then later, a user can select the bookmark to redisplay the set. If the query portion of the bookmark is selected, then any additional images that currently satisfy the query will also become members of the set.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for visualizing a plurality of images in a circular graphical user interface, comprising:

selecting the plurality of images from a database;

orienting each selected image with respect to a global polar coordinate system, a local polar coordinate system, and a radial distance from the center of each image to the center of a display surface of the circular graphical user interface, a global angle α of the global polar coordinate system measuring rotation of the center of the each image around the center of the display surface, and a local angle β measuring an offset of a central axis of each image from the angle α; and rendering each oriented image on the display surface of the circular graphical user interface.

2. The method of claim 1 further comprising:

rotating the global polar coordinate system while holding each local polar coordinate system fixed with respect to the rotated global polar coordinate system.

3. The method of claim 1 wherein a size of the display surface is proportional to a virtual depth of the display surface.

4. The method of claim 1 further comprising:

orienting the local angle β so that the central axis of each images is substantially oriented in the direction of the center of the display surface.

5. The method of claim 4 wherein a size of each image is proportional to corresponding virtual depth with respect to the virtual depth of the display surface.

6. The method of claim 1 further comprising:

orienting the local angle β so that the central axes of the images are parallel to each other.

7. The method of claim 6 further comprising:

orienting the images with respect to a user viewing the oriented images.

8. The method of claim 1 wherein a size of a particular image automatically increases when the particular image is nearer to a periphery of the display surface and decreases when the particular image is nearer the center of the display surface.

9. The method of claim 8 wherein a normalized radius R of the display surface is 1.0 and a radial distance r from the center of the particular image to the periphery of the display surface is in a range 0 to 1.0, and a first scaling factor applied to the particular image is $$\left(\frac{R}{1-r}\right)^N.$$

10. The method of claim 8 wherein N is 0.5.

11. The method of claim 8 wherein the scaling factor has a minimum threshold.

12. The method of claim 1 wherein a size of a particular image automatically decreases when the particular image is nearer to a periphery of the display surface and increases when the particular image is nearer the center of the display surface.

13. The method of claim 12 wherein a normalized radius R of the display surface is 1.0 further comprising:

applying a minimum scaling factor when a particular image is near a periphery of the display surface;

applying a maximum scaling factor when the particular image is near the center of the display surface; and otherwise a second scaling factor is $$\frac{(MAXIMUM - MINIMUM) \times (1 - R)}{1 - r1 - r2},$$

where r1 is the minimum radius near the periphery, and r2 is the maximum radius near the center of the display surface.

14. The method of claim 1 further comprising:
arranging the oriented images in a hierarchical manner using the global and local polar coordinate systems.

15. The method of claim 1 further comprising:
locating a particular image that is a root node of the hierarchy near the center for the display surface.

16. The method of claim 1 further comprising:
bookmarking a set of images with a bookmark; and
redisplaying the bookmarked set of images.

17. The method of claim 16 wherein the bookmark includes a query used to select the set of images.

18. A system for visualizing a plurality of images in a circular graphical user interface, comprising:

a database storing the plurality of images;

a query for selecting the plurality of images;

means for orienting each selected image with respect to a global polar coordinate system, a local polar coordinate system, and a radial distance from the center of each image to the center of a display surface of the circular graphical user interface, a global angle $\alpha$ of the global polar coordinate system measuring rotation of the center of the each image around the center of the display surface, and a local angle $\beta$ measuring an offset of a central axis of each image from the angle $\alpha$; and projecting means for rendering each oriented image on the display surface of the circular graphical user interface.

* * * * *